US006903863B1

(12) United States Patent
Carniel et al.

(10) Patent No.: US 6,903,863 B1
(45) Date of Patent: Jun. 7, 2005

(54) GAIN FLATTENED BI-DIRECTIONALLY PUMPED RAMAN AMPLIFIER FOR WDM TRANSMISSION SYSTEMS

(75) Inventors: Federico Carniel, Milan (IT); Fabrizio Di Pasquale, Milan (IT); Ada Livia Braverman, Agnadello (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/006,535

(22) Filed: Dec. 5, 2001

(51) Int. Cl.[7] ............................................... H01S 3/00
(52) U.S. Cl. ....................................................... 359/334
(58) Field of Search .......................................... 359/334

(56) References Cited

U.S. PATENT DOCUMENTS

| | | | |
|---|---|---|---|
| 6,181,464 B1 * | 1/2001 | Kidorf et al. ................ | 359/334 |
| 6,191,877 B1 | 2/2001 | Chraplyvy et al. .......... | 359/124 |
| 6,292,288 B1 * | 9/2001 | Akasaka et al. ............. | 359/334 |
| 6,344,922 B1 * | 2/2002 | Grubb et al. ................ | 359/334 |
| 6,356,383 B1 * | 3/2002 | Cornwell et al. ........... | 359/334 |
| 6,384,962 B1 * | 5/2002 | Foursa et al. ............... | 359/334 |
| 6,384,963 B2 * | 5/2002 | Ackerman et al. .......... | 359/334 |
| 2002/0021864 A1 * | 2/2002 | Emori et al. .................... | 385/27 |
| 2002/0149838 A1 * | 10/2002 | Wang et al. ................. | 359/334 |
| 2002/0163712 A1 * | 11/2002 | Hamoir ........................ | 359/334 |

OTHER PUBLICATIONS

Namiki et al. "Ultrabroad–Band Raman Amplifiers Pumped and Gain–Equalized by Wavelength–Division–Multiplexed High–Powe Laser Diodes." IEEE J. Selected Topics in Quantum Electronics, 7:1, Jan./Feb. 2001, pp. 3–16.*

T. Tanaka et al., "Gain–Flattened Raman Amplification Scheme for WDM Transmission", OAA' 2001 Stresa, Italy, paper OtuA3.

H. Suzuki et al., "1–Tb/s (100×10 Gb/s) Super–Dense WDM Transmission with 25 GHz Channel Spacing in the Zero–Dispersion Region Employing Distributed Raman Amplification Technology", IEEE Photonics Technology Letters, vol. 2, No. 7, Jul. 2000.

M. Nissov et al., "Rayleigh Crosstalk in Long Cascades of Distributed Unsaturated Raman Amplifiers", Electronics Letters, 10th Jun. 1999, vol. 35, No. 12, pp. 997–998.

* cited by examiner

Primary Examiner—Thomas H. Tarcza
Assistant Examiner—Deandra M. Hughes
(74) Attorney, Agent, or Firm—Ritter, Lang & Kaplan LLP (57) ABSTRACT

Raman amplification of a WDM signal with excellent gain flatness across a very large bandwidth is achieved. Co-propagating and counter-propagating Raman pumping are combined in the same fiber. Multiple pumping wavelengths are employed. Wavelengths employed for co-propagating pumping and wavelengths employed for counter-propagating pumping alternate in order of wavelength. In one embodiment, N co-propagating pump wavelengths and N+1 counter-propagating pump wavelengths are used. Alternatively, one may use N+1 co-propagating pump wavelengths and N counter-propagating pump wavelengths.

14 Claims, 8 Drawing Sheets

GAIN FLATTENED BI-DIRECTIONALLY PUMPED RAMAN AMPLIFIER FOR WDM TRANSMISSION SYSTEMS

STATEMENT OF RELATED APPLICATIONS

The present invention is related to the subject matter of U.S. Patent App. Ser. No. 09/899,872, entitled "Reduced Four-Wave Mixing Raman Amplification Architecture," filed on Jul. 5, 2001, the contents of which are herein incorporated by reference in their entirety for all purposes.

BACKGROUND OF THE INVENTION

The present invention relates to optical communication systems, and more particularly to amplification in optical communication systems.

The enormous growth in Internet traffic is challenging the telecommunication industry to develop technology that will greatly expand the available bandwidth of backbone communication networks. Further improvements in optical communication technology hold great promise to meet continuing demands for greater and greater bandwidth.

Wavelength Division Multiplexing (WDM) technology, in particular dense WDM (DWDM) techniques, permit the concurrent transmission of multiple channels over a common optical fiber. The advent of Erbium-doped fiber amplifiers (EDFAs) has accelerated the development of WDM systems by providing a cost-effective optical amplifier that is transparent to data rate and format. An EDFA amplifies all the wavelengths simultaneously, enabling the composite optical signal to travel large distances (e.g., 600 km or greater) without regeneration.

One of the principal limitations of EDFA technology is limited bandwidth. Discrete and distributed Raman amplifiers have been developed to overcome this limitation. Raman amplifiers provide very high gain across a wide range of wavelengths, provide improved optical signal to noise ratio (OSNR) system performance, and also drastically reduce impairments due to fiber non-linearity.

Successful use of Raman amplification requires flat gain across the spectrum occupied by the WDM signal. Flat gain can be provided by the use of gain flattening filters (GFFs) but their utility is limited due to their insertion loss which degrades OSNR performance. As the gain variation that the GFF must compensate increases so does the insertion loss. The degradation of OSNR detrimentally reduces the span length that may be achieved without optical amplification and the link length that may be achieved without regeneration of the optical signal from recovered data.

One way of achieving flat gain in Raman amplification is by using wavelength multiplexed pump lasers. However, even using this technique, further increases in the desired bandwidth of the WDM signal to accommodate increases in data traffic cannot be achieved without the detrimental addition of a gain-flattening filter.

What is needed are systems and methods for optical amplification of WDM signals that provide flat gain across wavelength without sacrificing OSNR performance.

SUMMARY OF THE INVENTION

By virtue of one embodiment of the present invention, Raman amplification of a WDM signal with excellent gain flatness across a very large bandwidth is achieved. Co-propagating and counter-propagating Raman pumping are combined in the same fiber. Multiple pumping wavelengths are employed. Wavelengths employed for co-propagating pumping and wavelengths employed for counter-propagating pumping alternate in order of wavelength. In one embodiment, N co-propagating pump wavelengths and N+1 counter-propagating pump wavelengths are used. Alternatively, one may use N+1 co-propagating pump wavelengths and N counter-propagating pump wavelengths.

A first aspect of the present invention provides apparatus for amplifying an optical signal in an optical communication system. The apparatus includes: a fiber, a first group of N optical pump energy sources disposed to propagate optical energy into the fiber in a first direction, and a second group of N+1 optical pump energy sources disposed to propagate optical energy into the fiber in a second direction opposite to the first direction. N is greater than or equal to 1. Raman amplification is induced in the fiber. Optical pump energy sources of the first group and the second group each have distinct pump wavelengths.

A second aspect of the present invention provides a method for amplifying an optical signal within a fiber by exploiting Raman affects. The method includes: injecting optical pump energy at N pump wavelengths into the fiber in a first direction and injecting optical pump energy at N+1 pump wavelengths into the fiber in a second direction opposite to the first direction. N is greater than or equal to 1. The N pump wavelengths and the N+1 pump wavelengths alternate with one another in order of wavelength.

Further understanding of the nature and advantages of the inventions herein may be realized by reference to the remaining portions of the specification and the attached drawings.

DESCRIPTION OF SPECIFIC EMBODIMENTS

One embodiment of the present invention is directed towards a Raman amplification system having many beneficial characteristics including, e.g., excellent gain flatness and excellent OSNR. Representative applications include DWDM transmission systems, DWDM receiver systems, and mid-line amplification in DWDM links. For example, the disclosed Raman amplification systems may be applied to DWDM communication links that carry an optical signal over 2500 km without regeneration of the optical signal from recovered data. In one embodiment, as many as 140 or more WDM channels spaced e.g., 25 GHz or less apart may be accommodated over such ultra-long distances.

One embodiment of the present invention provides a Raman amplification scheme that exploits a combination of counter-propagating Raman pumping and co-propagating Raman pumping as disclosed in U.S. patent application Ser. No. 09/899,872. About half of the total on-off gain is provided by co-propagating Raman pumping. The use of bi-directional Raman pumping achieves a better combination of OSNR performance and four-wave mixing crosstalk performance than can be achieved with counter-propagating pumping alone.

For the Raman amplification systems disclosed herein, both co-propagating and counter-propagating pump energy are used. In one embodiment, N co-propagating pump wavelengths and N+1 counter-propagating pump wavelengths are used. Alternatively, N+1 co-propagating pump wavelengths and N counter-propagating pump wavelengths may be used. The pump wavelengths for each direction of propagation are configured such that co-propagating and counter-propagating pump wavelengths alternate in order of wavelength. One of the pumping directions employs an odd number of pumping wavelengths and gives rise to what may be described as a "W-shaped" frequency response whereas the other pumping direction employing an even number of pumping wavelengths giving rise to an "M-shaped" frequency response. The pumping wavelengths and pumping power provided on each wavelength are selected such that the two responses compensate for one another. In this way, a very flat gain response across frequency is achieved without the use of a gain-flattening filter, thereby protecting OSNR performance from the insertion loss incurred by such filters.

Figure 1:
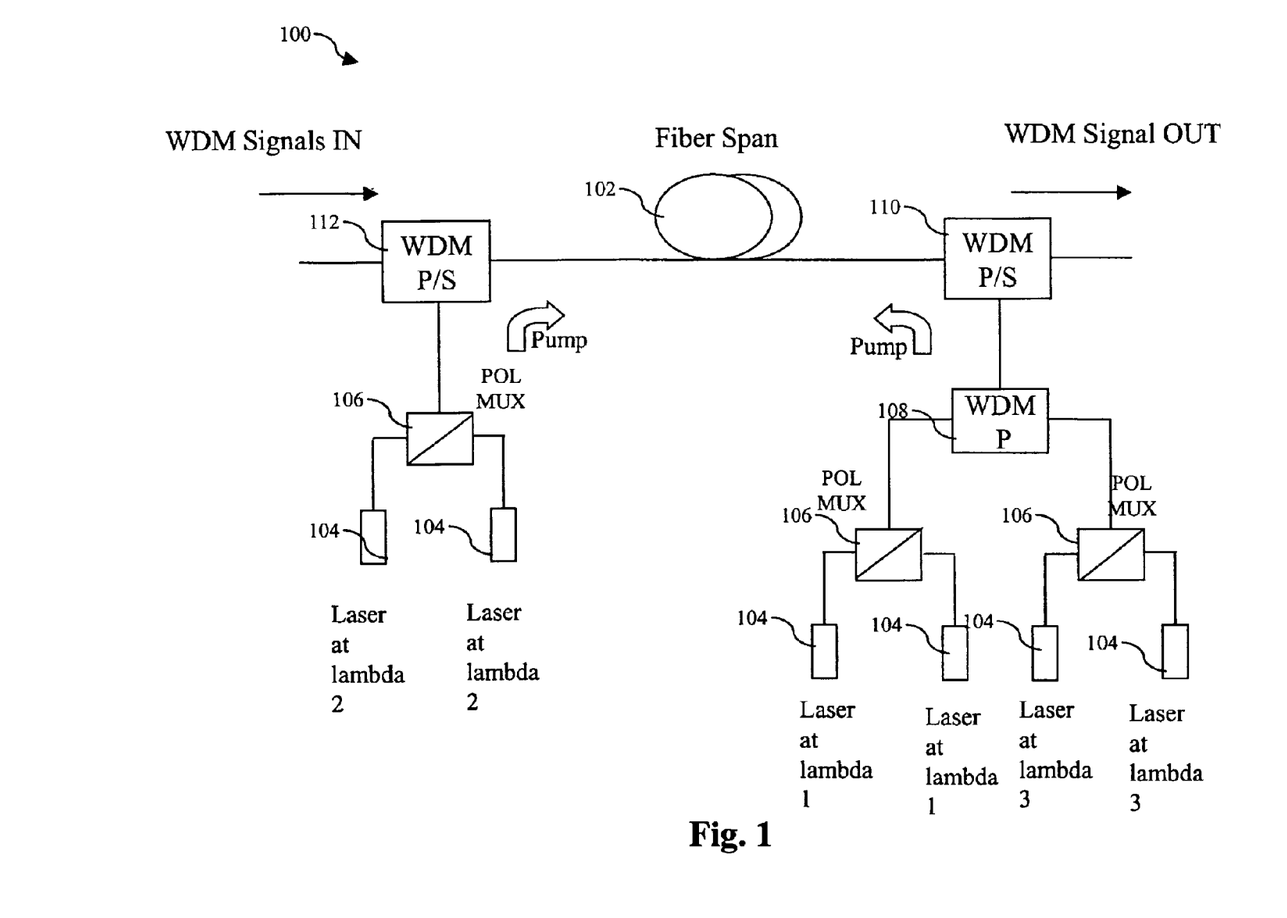
FIG. 1 depicts a Raman amplification system employing a bi-directional Raman pumping scheme employing three pump wavelengths according to one embodiment of the present invention.

FIG. 1 depicts a distributed Raman amplification system 100 according to one embodiment of the present invention. Raman amplification occurs within a fiber span 102. Fiber span 102 serves as a transmission fiber extending between two geographically separated points. Three pump wavelengths are employed, $\lambda_1$, $\lambda_2$, and $\lambda_3$. $\lambda_1$ and $\lambda_3$ are used for counter-propagating pump energy into fiber span 102, i.e., pump energy at these wavelengths propagates in a direction opposite to that of the WDM signal to be amplified. Pump energy at $\lambda_2$ co-propagates through fiber span 102 i.e., propagates through fiber span 102 in the same direction as the signal to be amplified.

The laser pump energy should be substantially unpolarized to avoid problems due to polarization-dependent gain (PDG). This effect is particularly a concern for the co-propagating pump energy. Preferably, the polarization of the co-propagating pump energy should be 2% or less while the polarization of the counter-propagating pump energy should be 10% or less. For each wavelength there are two lasers 104 for generating the pump energy and a polarization multiplexer 106 to combine the outputs of the two lasers. A depolarizer may be used instead to provide the necessary degree of depolarization. Also a fiber laser operating on multiple wavelengths or several wavelength multiplexed fiber lasers could be used for counter-propagating pumping without use of a depolarizer because of the relaxed depolarization requirement imposed on the counter-propagating pump energy.

The laser pump energy should also have relatively low relative intensity noise (RIN). The maximum desired level of RIN depends on the specific system characteristics and in particular on the number of spans. Suggested maximum values are −160 dB/Hz from 10 KHz to 1 GHz for multimode DFB pump lasers and −130 dB/Hz from 10 KHz to 1 GHz for Fabry-Perot lasers. Accordingly, lasers 104 are preferably Fabry-Perot lasers or distributed-feedback (DFB) multimode pump lasers on the co-propagating side. The lasers for the counter-propagating side may be Fabry-Perot lasers, DFB multimode pump lasers, or fiber lasers.

The multiple pump wavelengths used in the counter-propagating direction are combined with a wavelength division multiplexer 108. The counter-propagating pump energy is injected into fiber span 102 by employing a pump/signal wavelength division multiplexer 110. A three-port optical circulator may be used instead of pump/signal wavelength division multiplexer 110. The co-propagating pump energy is injected into fiber span 102 by use of a pump/signal wavelength division multiplexer 112.

In one specific implementation of Raman amplification system 100, fiber span 102 incorporates non-zero dispersion shifted fiber. The counter-propagating pump wavelengths are 1462 nm and 1499 nm with 300 mW and 460 mW of pump power, respectively, being used for these wavelengths. In the co-propagating direction, 350 mW of pump power at 1489 nm is used. These wavelengths and pumping powers have been carefully chosen to provide a flat gain profile across wavelength. The WDM system bandwidth is 27 nm extending from approximately 1573 nm to 1600 nm incorporating, e.g., approximately 140 channels spaced 25 GHz apart, each carrying a data rate of 10 Gbps. The average Raman gain is 24.8 dB which is sufficient to compensate for a 22 dB loss within fiber span 102 and losses through multiplexers 110 and 112.

Figure 2:
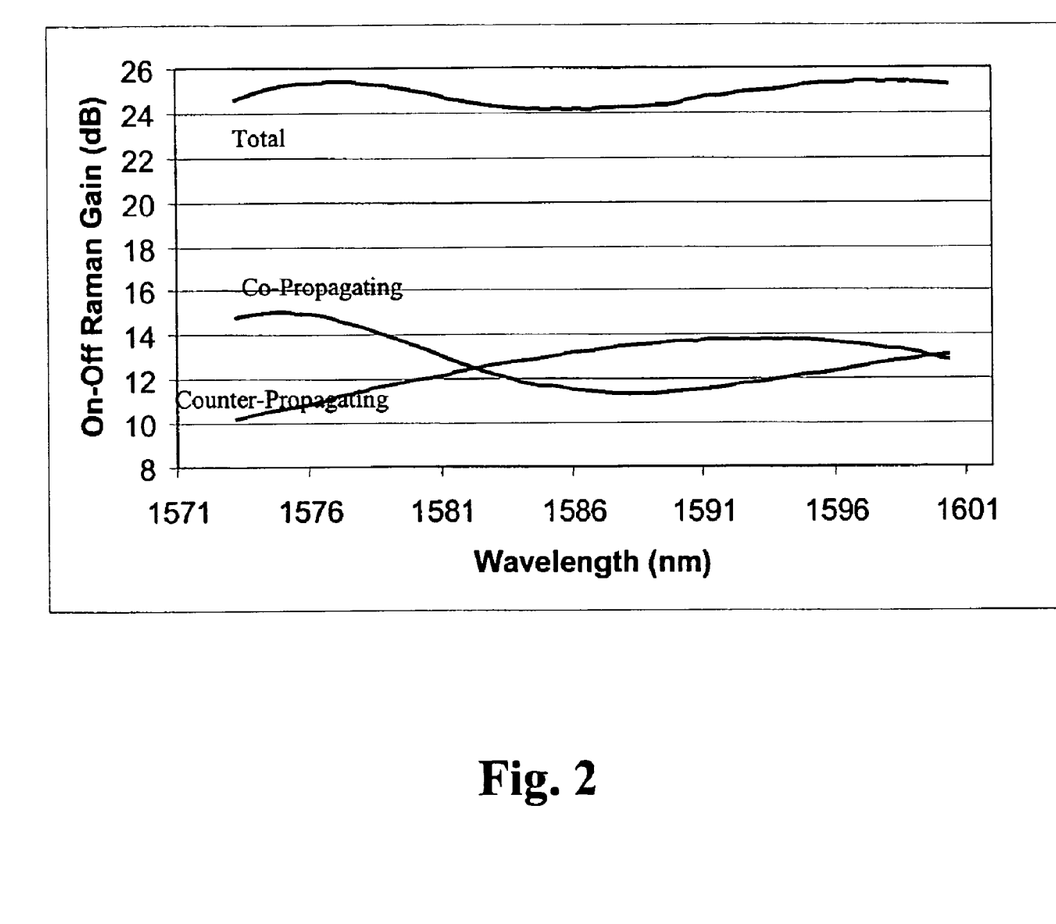
FIG. 2 depicts the variation of co-propagating, counter-propagating, and total on-off Raman gain over wavelength for one implementation of the Raman amplification system of FIG. 1.

FIG. 2 depicts the variation of total on-off Raman amplification gain over wavelength as well as the variations in the gain due to co-propagating pump energy and due to counter-propagating pump energy. It can be seen that the variations in gain over wavelength due to the co-propagating and counter-propagating pump energy tend to compensate for one another to produce a relatively flat total gain profile.

Figure 3:
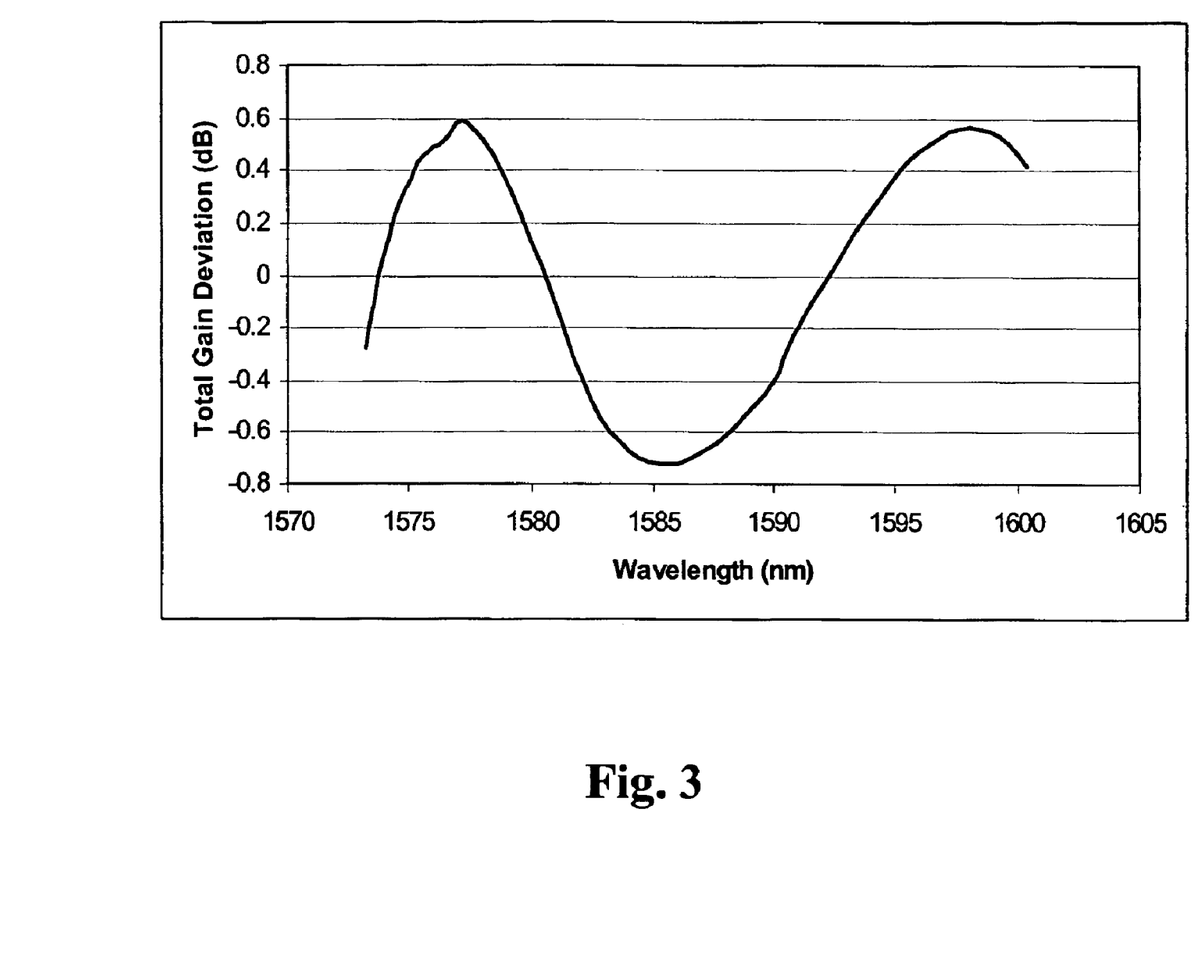
FIG. 3 depicts gain deviation over wavelength for one implementation of the Raman amplification system of FIG. 1.

FIG. 3 shows the variation of total gain deviation over wavelength. The average gain deviation is less than 0.7 dB where the average gain deviation is defined as the average difference between the actual Raman gain at all signal wavelengths and the average gain which in this particular example is 24.8 dB. The gain variation (difference between maximum and minimum on-off gain for all WDM channels) is less than 1.5 dB.

Figure 4:
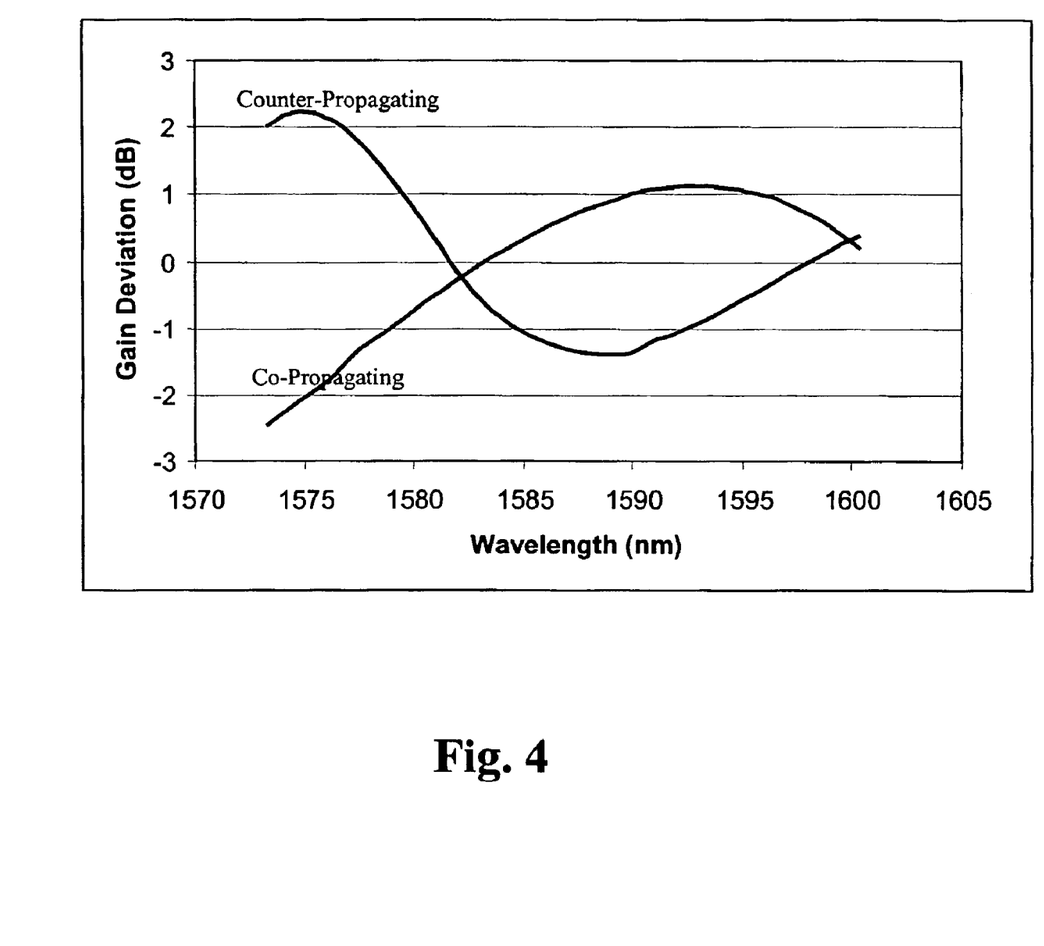
FIG. 4 depicts the components of gain deviation due to co-propagating pumping and due to counter-propagating pumping for one implementation of the Raman amplification system of FIG. 1

For comparison, FIG. 4 shows the variation of gain deviation over frequency considering the co-propagating and counter-propagating contributions separately. It can be seen that the gain variation due to both contributions is less than half that due solely to either contribution.

Figure 5:
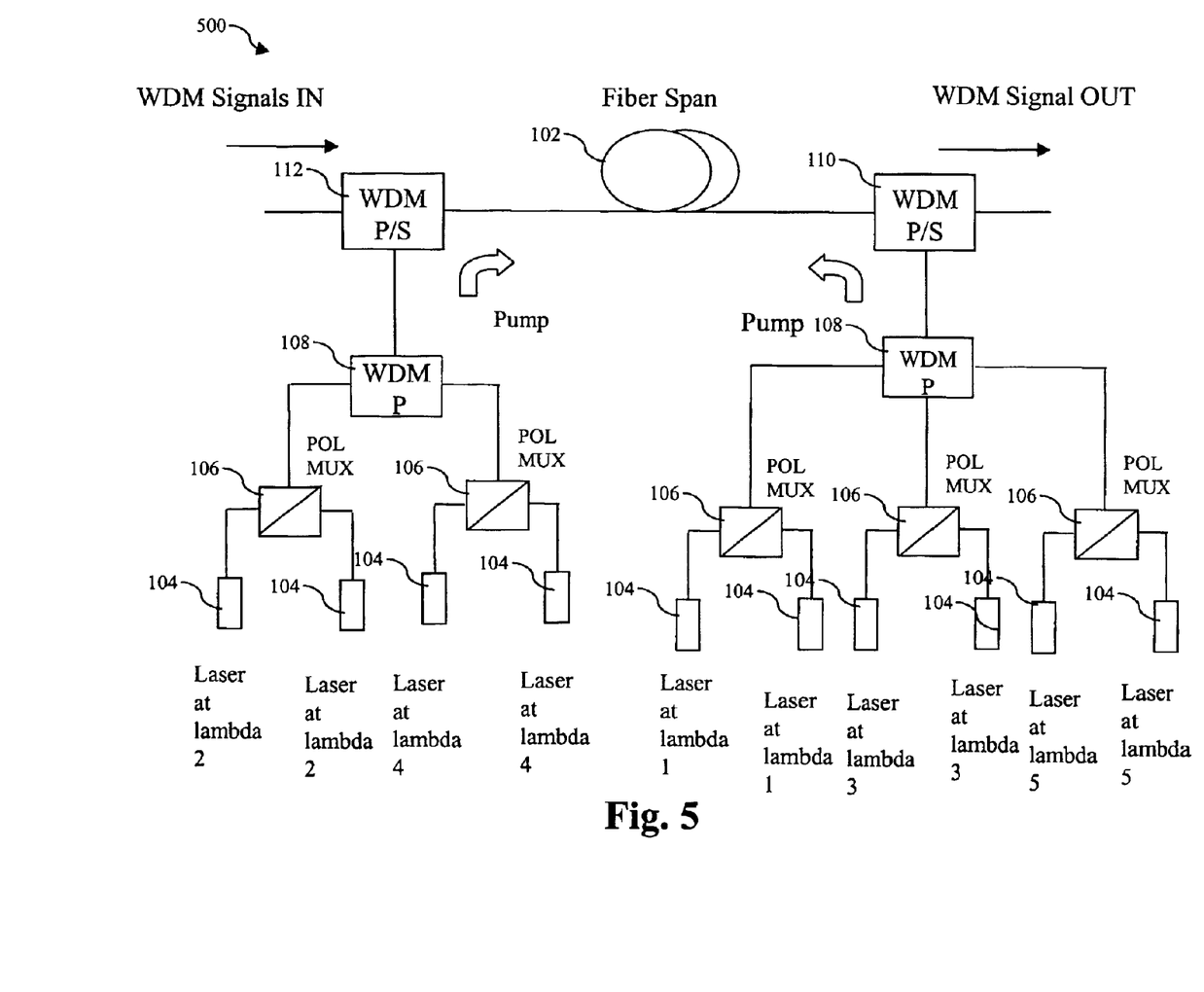
FIG. 5 depicts a Raman amplification system employing a bi-directional Raman pumping scheme employing five pump wavelengths according to one embodiment of the present invention.

In an alternative embodiment, two pump wavelengths are used for co-propagating optical pump energy and three pump wavelengths are used for counter-propagating pump energy. FIG. 5 depicts a Raman amplification system 500 employing this scheme. The structure is similar to that depicted in FIG. 1 and like reference designators are used to designate like elements. Here, pump energy at $\lambda_1$, $\lambda_3$, and $\lambda_5$ counter-propagates relative to the WDM signal to be amplified while pump energy at $\lambda_2$ and $\lambda_4$ co-propagates with the WDM signal.

In a specific implementation of Raman amplification system 500, a total gain of 23 dB is desired to compensate for the loss of fiber span 102 and multiplexers 110 and 112. The system bandwidth is 45 nm from 1569 nm to 1614 nm. Within the system bandwidth, e.g., 225 channels each carrying 10 Gbps spaced 25 GHz apart may be provided. The counter-propagating pump wavelengths are 1455 nm, 1472 nm, and 1509 nm with pump powers of 120 mW, 145 mW, and 160 mW, respectively. The co-propagating pump wavelengths are 1463 nm and 1499 nm with pump powers of 215 mW and 225 mW, respectively. Again, these pump powers and wavelengths have been carefully chosen for optimal gain flatness. The average Raman gain within fiber span 102 in FIG. 5 is then 23.4 dB which is almost sufficient to compensate for the span loss and loss within multiplexers 110 and 112.

Figure 6:
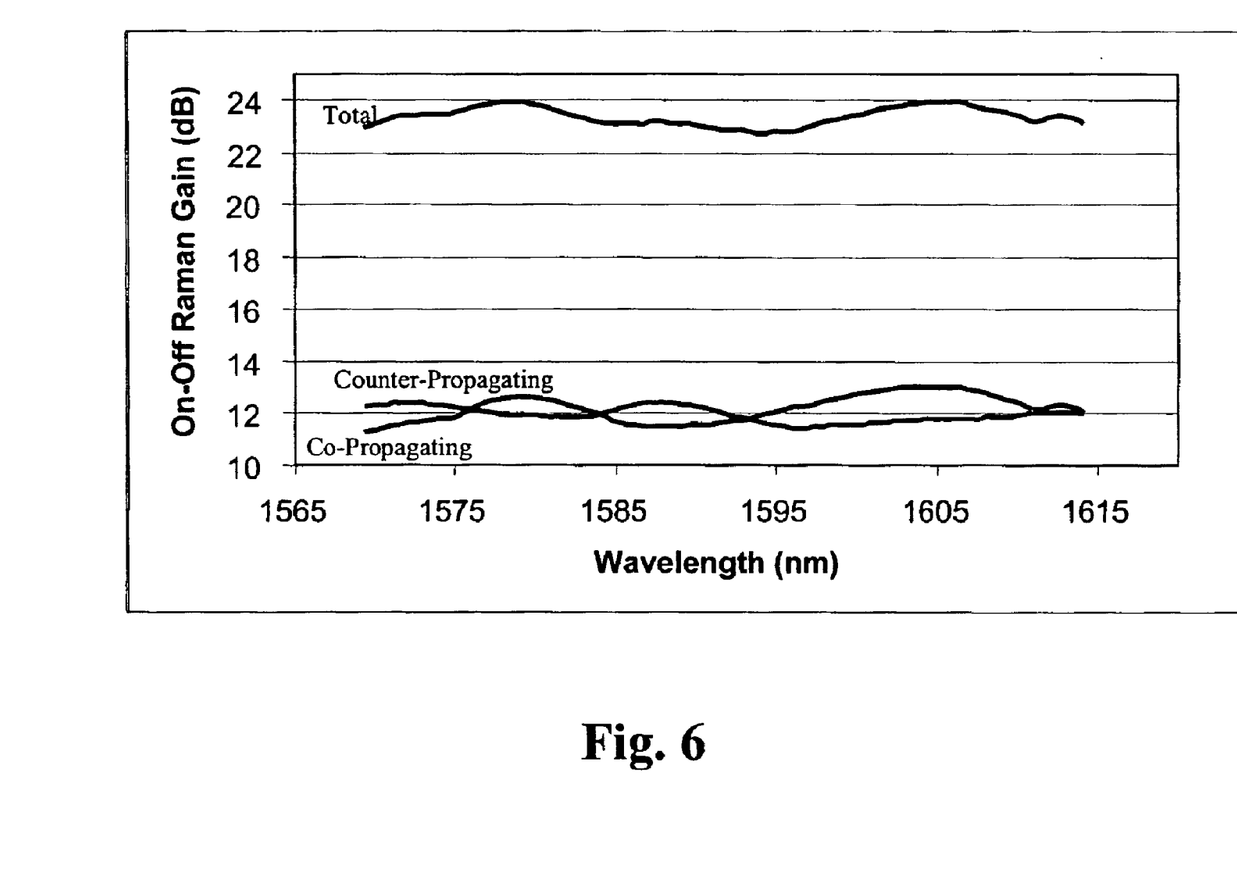
FIG. 6 depicts the variation of co-propagating, counter-propagating, and total on-off Raman gain over wavelength for one implementation of the Raman amplification system of FIG. 5.

FIG. 6 shows the variation of on-off Raman gain over wavelength for Raman amplification system 500 as well as the variations of the gain contributions of the co-propagating and counter-propagating pumps. Again, it can been seen that the variations in gain over wavelength due to the contributions of the co-propagating pumps and counter-propagating pumps tend to cancel each other out.

Figure 7:
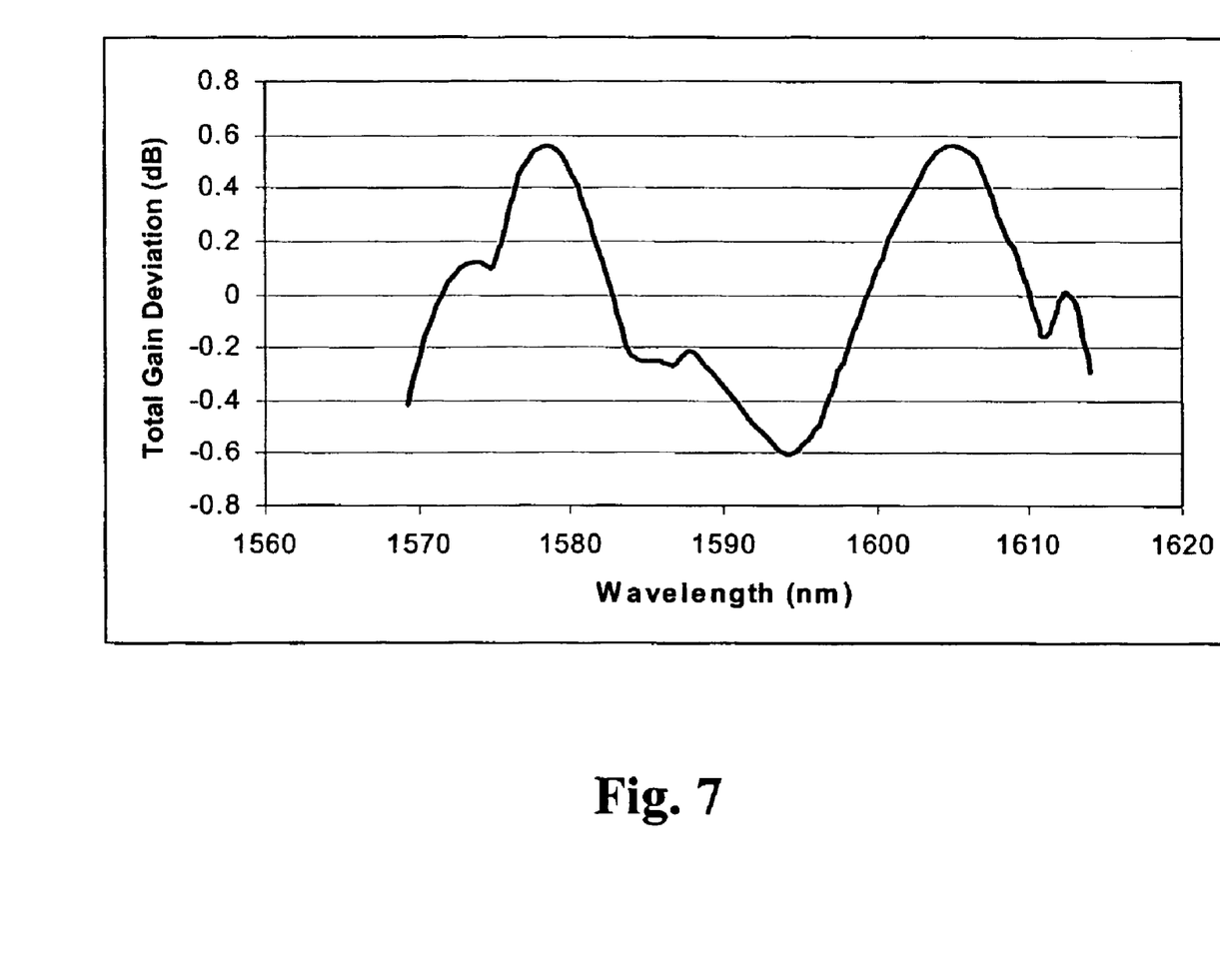
FIG. 7 depicts gain deviation over wavelength for one implementation of the Raman amplification system of FIG. 5.
Figure 8:
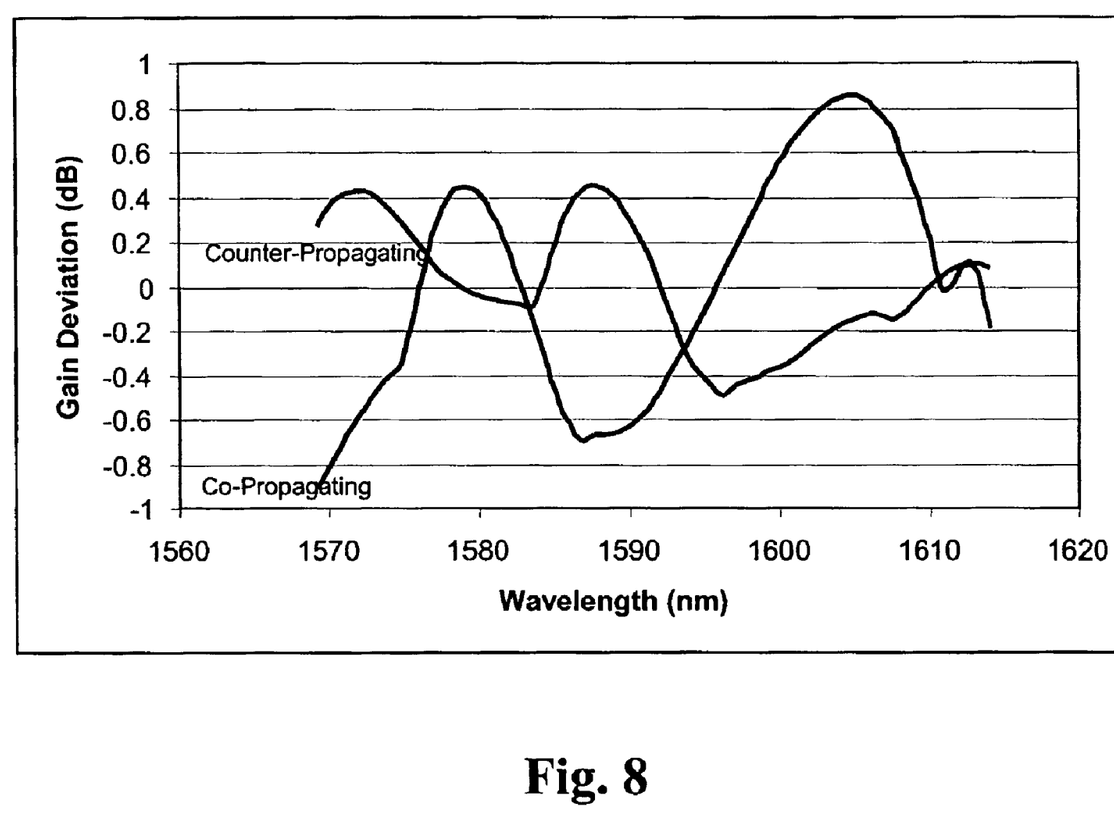
FIG. 8 depicts the components of gain deviation due to co-propagating pumping and due to counter-propagating pumping for one implementation of the Raman amplification system of FIG. 5.

FIG. 7 shows that the total average gain deviation is less than 0.6 dB and the gain variation is approximately 1.2 dB. FIG. 8 shows the gain deviations due to the co-propagating and counter-propagating contributions. For comparison, FIG. 8 shows the gain deviations over wavelength for the co-propagating and counter-propagating contributions to total gain.

It can be seen in comparing the plots of FIG. 6 that although the average total gain with bi-directional pumping (about 23.4 dB) is about twice the average gain of the co-propagating and counter-propagating contributions (about 12 dB), its variation (1.2 dB) is less than the variation of the co-propagating contribution (about 1.8 dB) and comparable to the variation of the counter-propagating contribution (about 1 dB). However, if the same wavelengths were used for co-propagating and counter-propagating pumping, one would expect the total gain variation to be greater than 3 dB.

It will be seen then that an optical amplification system according to the present invention provides many advantages. For a total Raman gain of 24 dB, a gain variation of 1.2 dB across wavelength may be achieved without any use of gain flattening filtering. If filtering is required to further flatten the gain profile, a relatively low insertion loss filter may be employed because the gain profile at the filter input will already be relatively flat. The lessening of filter requirements leads directly to a desirable reduction in system cost.

Compared to current distributed Raman amplification systems, the above-described system provides superior attenuation of double Rayleigh backscattering noise. Also, for a given OSNR level, the above-described system provides superior suppression of four-wave mixing crosstalk while for a given level of four-wave mixing crosstalk suppression, superior OSNR is attained.

It is understood that the examples and embodiments that are described herein are for illustrative purposes only and various modifications are changes in light there of will be suggested to persons skilled in the art and are to be included within the spirit and purview of this application and scope of the appended claims and their full scope of equivalents. For example, the present invention is not restricted to distributed Raman amplification systems but may also be applied to lumped Raman amplification.

What is claimed is:

1. In an optical communication system, apparatus for amplifying an optical signal, said apparatus comprising:
   a fiber;
   a first group of N optical pump energy sources disposed to propagate optical energy into said fiber in a first direction; and
   a second group of N+1 optical pump energy sources disposed to propagate optical energy into said fiber in a second direction opposite to said first direction; and
   wherein N is greater than or equal to 1, Raman amplification is induced in said fiber, and said optical pump energy sources of said first group and said second group each have distinct pump wavelengths, said distinct pump wavelengths alternating in order of wavelength between said first group and said second group; and
   wherein said pump wavelengths of said optical pump energy sources are selected to flatten an amplification response of said fiber across a desired frequency band.

2. The apparatus of claim 1 wherein said first direction comprises a direction of propagation of said signal through said fiber and said second direction comprises a direction opposite to said direction of propagation of said signal through said fiber.

3. The apparatus of claim 1 wherein said second direction comprises a direction of propagation of said signal through said fiber and said first direction comprises a direction opposite to said direction of propagation of said signal through said fiber.

4. The apparatus of claim 1 wherein a first gain profile induced by said first group of optical pump energy sources and a second gain profile induced by said second group of optical pump energy sources compensate each other to provide a substantially flat total gain profile.

5. The apparatus of claim 1 wherein at least one optical pump energy source of said first group of optical pump energy sources and said second group of optical pump energy sources comprises a substantially depolarized optical pump energy source.

6. In an optical communication system, a method for amplifying an optical signal within a fiber by exploiting Raman effects, said method comprising:
   injecting optical pump energy at N pump wavelengths into said fiber in a first direction; and
   injecting optical pump energy at N+1 pump wavelengths into said fiber in a second direction opposite said first direction; and
   wherein N is greater than or equal to 1 and said N pump wavelengths and said N+1 pump wavelengths alternate with one another in order of wavelength; and wherein said N pump wavelengths and said N+1 pump wavelengths are selected to flatten an amplification response of said fiber across a desired frequency band.

7. The method of claim 6 wherein said first direction comprises a direction of propagation of said signal through said fiber and said second direction comprises a direction opposite to said direction of propagation of said signal through said fiber.

8. The method of claim 6 wherein said second direction comprises a direction of propagation of said signal through said fiber and said first direction comprises a direction opposite to said direction of propagation of said signal through said fiber.

9. The method of claim 6 wherein a first gain profile induced by injection of said N pump wavelengths and a second gain profile induced by injection of said N+1 pump wavelengths compensate each other.

10. The method of claim 6 wherein injecting optical energy on at least one of said N pump wavelengths or N+1 pump wavelengths comprises injecting substantially depolarized optical energy.

11. In an optical communication system, apparatus for amplifying an optical signal within a fiber by exploiting Raman effects to achieve a desired gain level, said apparatus comprising:

means for injecting optical pump energy at N pump wavelengths into said fiber in a first direction; and means injecting optical pump energy at N+1 pump wavelengths into said fiber in a second direction opposite said first direction; and wherein N is greater than or equal to 1 and said N pump wavelengths and said N+1 pump wavelengths alternate with one another in order of wavelength; and wherein said N pump wavelengths and said N+1 pump wavelengths are selected to flatten an amplification response of said fiber across a desired frequency band.

12. The apparatus of claim 11 wherein said first direction comprises a direction of propagation of said signal through said fiber and said second direction comprises a direction opposite to said direction of propagation of said signal through said fiber.

13. The apparatus of claim 11 wherein said second direction comprises a direction of propagation of said signal through said fiber and said first direction comprises a direction opposite to said direction of propagation of said signal through said fiber.

14. The apparatus of claim 11 wherein a first gain profile induced by injection of said N pump wavelengths and a second gain profile induced by injection of said N+1 pump wavelengths compensate each other.

* * * * *